April 12, 1949.

C. A. NEWHALL 2,466,730

MACHINE FOR ASSEMBLING AND
MOLDING SHOE BOTTOM PARTS

Filed Oct. 24, 1946

Inventor
Carl A. Newhall
By his Attorney

April 12, 1949.  C. A. NEWHALL  2,466,730
MACHINE FOR ASSEMBLING AND
MOLDING SHOE BOTTOM PARTS
Filed Oct. 24, 1946  3 Sheets-Sheet 3
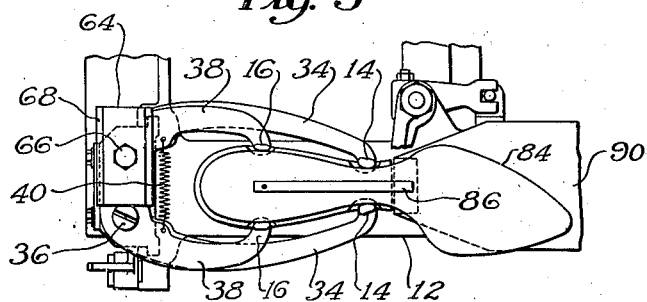
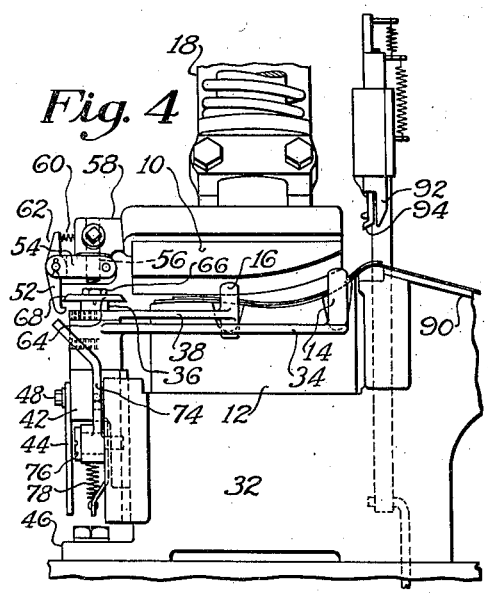
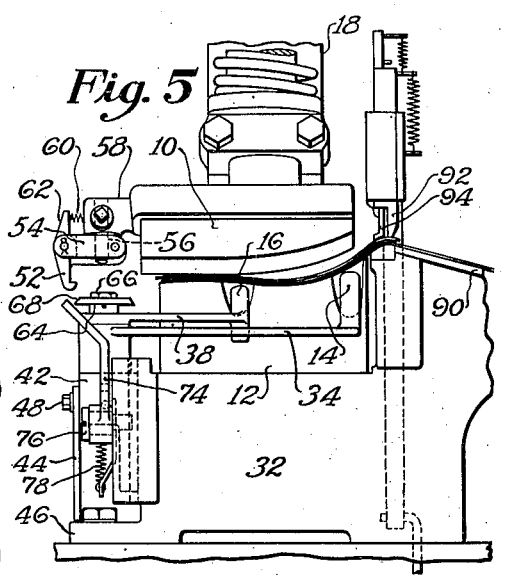
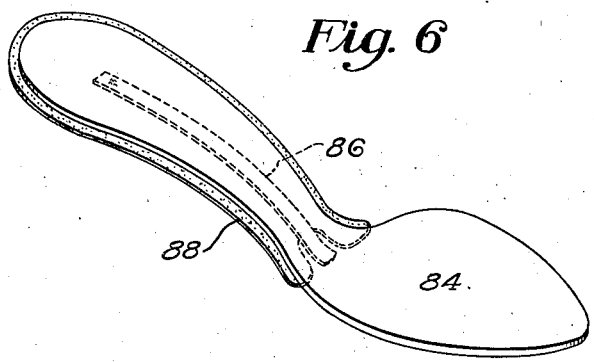
Inventor
Carl A. Newhall
By his Attorney Patented Apr. 12, 1949

2,466,730

UNITED STATES PATENT OFFICE 2,466,730

MACHINE FOR ASSEMBLING AND MOLDING SHOE BOTTOM PARTS

Carl A. Newhall, Peabody, Mass., assignor to United Shoe Machinery Corporation, Flemington, N. J., a corporation of New Jersey Application October 24, 1946, Serial No. 705,294

9 Claims. (Cl. 12—17)

This invention relates to molding machines and is herein illustrated in its application to machines for assembling and molding the parts of a composite shoe bottom unit comprising a moldable sole, a moldable shank and heel piece, and a steel shank stiffener positioned between the sole and the shank and heel piece and shaped to conform to the profile of the bottom of the shank portion of the last on which the shoe is to be made. A machine of this type is illustrated in United States Letters Patent No. 2,083,583, granted on June 15, 1937, on an application filed in the name of John M. Whelton.

In the manufacture of shoe bottom units comprising an insole, a shank and heel piece, and a shank stiffener, it has been found desirable to provide oversize shank and heel pieces, that is, shank and heel pieces which extend beyond the edge of the insole when mounted thereon, in order to obviate the necessity of providing a large run of sizes of shank and heel pieces to correspond with the different sizes of insoles to be assembled therewith. In the manufacture of such bottom units the oversize shank and heel piece is trimmed to the size of the insole after the parts have been assembled and molded.

It is an object of the present invention to provide a machine of the type above described which is constructed and arranged to facilitate the handling of such oversize shank and heel pieces.

Machines of this type are commonly provided with means for positioning an insole relatively to the mold members comprising members constructed and arranged to engage opposite portions of the edge face of the insole. The presence of the positioning members in contacting relation to the edge face of the insole interferes with the positioning of an oversize shank and heel piece upon the insole.

With a view to obviating this difficulty the present invention provides a carriage for said insole positioning members movable vertically downward to locate them in an inoperative position out of contact with the work and means actuated by a movement of separation of the mold members for positively moving said carriage upwardly to return the insole positioning members to their operative position ready for the next succeeding operation of the machine, the carriage being positioned normally at the lower extremity of its vertical movement. In the operation of the illustrated machine the insole positioning members are moved downwardly into their inoperative position immediately after the insole is located in the machine and prior to the starting of the power cycle. It is therefore desirable that the means which automatically actuates the carriage to return the insole positioning members to their operative position be disengaged from the carriage after performing its function so that the carriage will be free to move downwardly at the appointed time in the next succeeding operation of the machine. Accordingly, the illustrated carriage actuating means, in accordance with a further feature of the invention, is constructed and arranged for a movement of translation laterally, i. e. widthwise of the insole, in response to a second relative movement of the mold members, into a position in which said actuating means is out of contact with the carriage. After such relative movement of the mold members the insole positioning members are retained in their operative position by means herein illustrated as a detent operating on the carriage. The illustrated detent is retracted manually to permit the movement of the insole positioning members into their inoperative position prior to the mounting of the shank and heel piece on the insole. If the mold members should inadvertently be actuated without first retracting said detent to permit the carriage to return the insole positioning members to their inoperative position, the actuation of the mold members will cause such return movement of the insole positioning members since said members in their operative position are in the path of movement of one of the mold members. In order to prevent damage to the insole positioning members in the event of such an inadvertent operation of the machine, the detent above referred to is constructed and arranged to yield readily in response to the pressure of the mold member on the insole positioning members.

The invention will now be described with reference to the accompanying drawings and pointed out in the appended claims.

In the drawings,

Fig. 3 is a plan view illustrating said work positioning mechanism in engagement with the work;

Figs. 4 and 5 are front elevations illustrating said work positioning mechanism in two different positions; and Fig. 6 is a perspective view of a shoe bottom unit assembled and molded by the illustrated machine.

Figure 1:
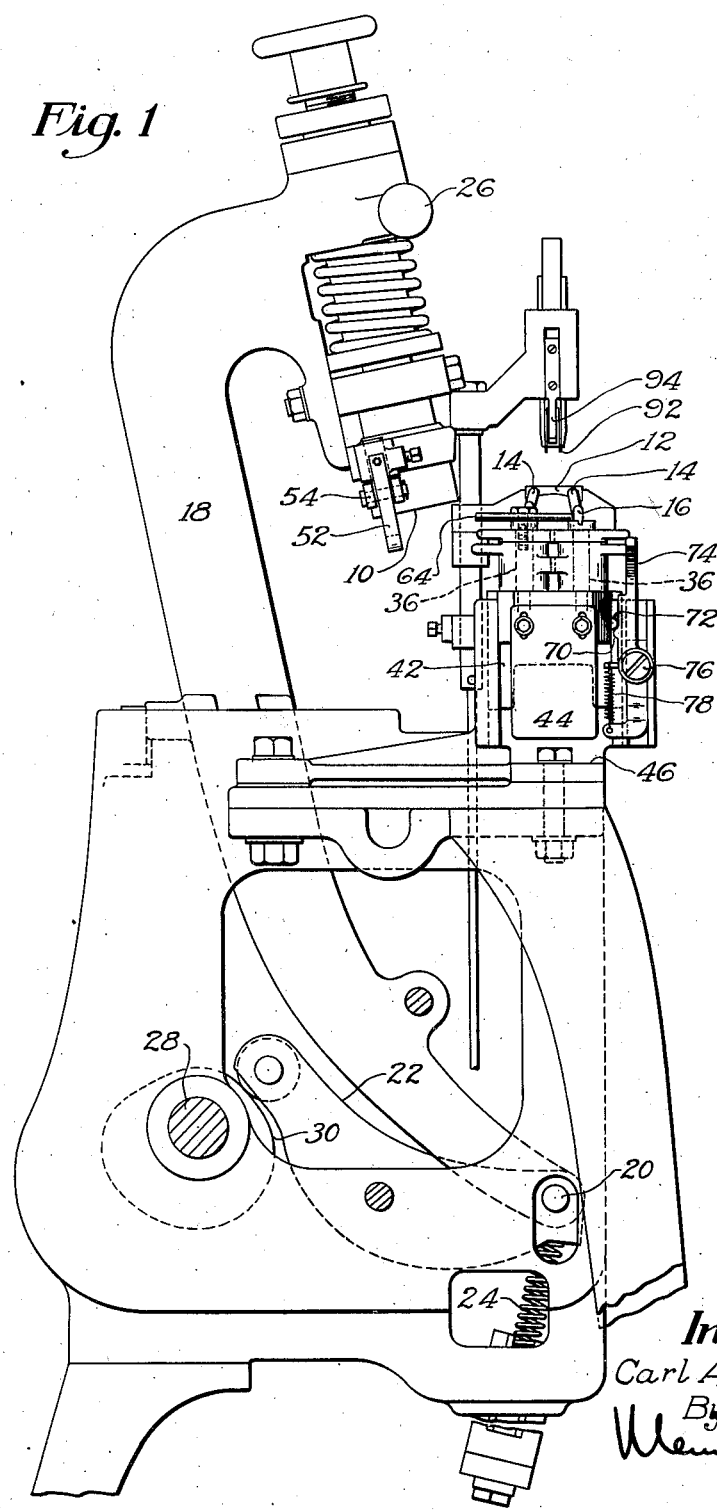
Fig. 1 is a side elevation of a machine embodying the present invention.
Figure 2:
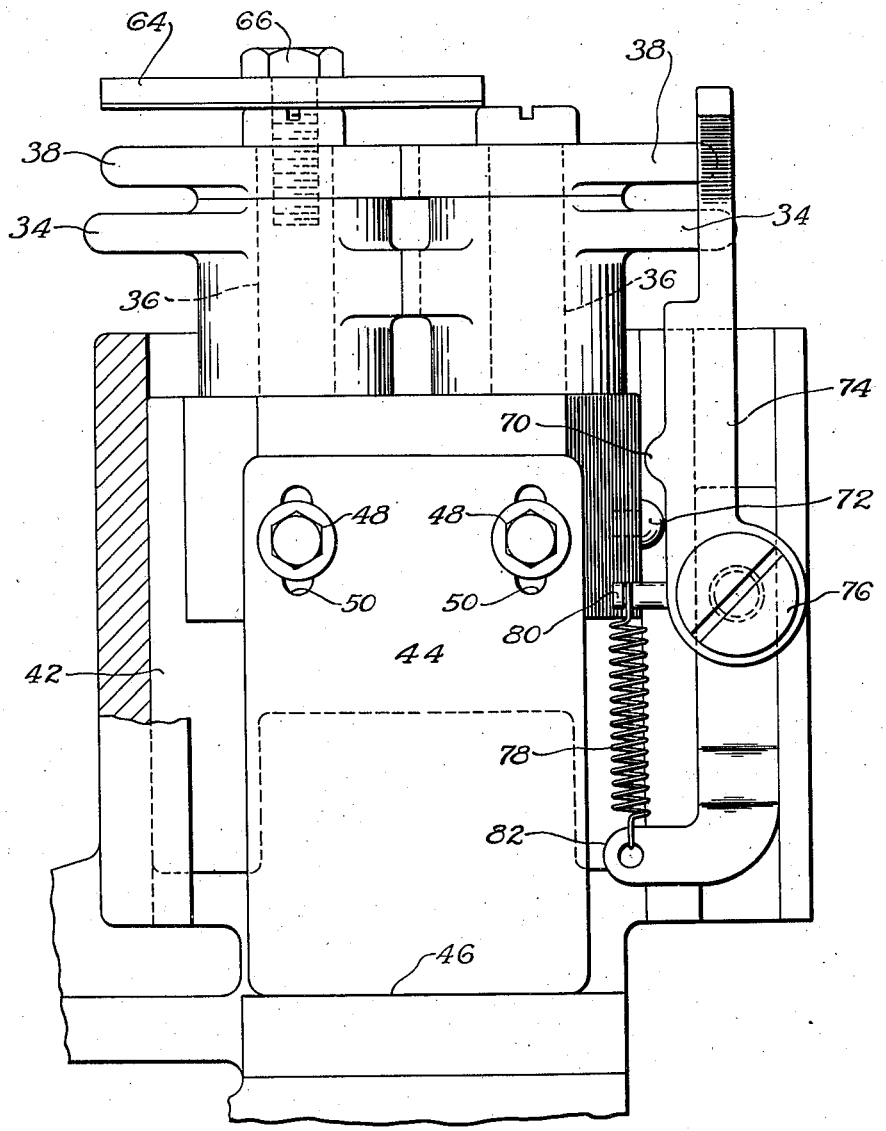
Fig. 2 is an enlarged view in side elevation, partly in section, illustrating certain work positioning mechanism of the machine.

The illustrated machine is substantially the same in its general organization as the machine illustrated in the Whelton patent above referred to. In common with the machine of the Whelton patent, it is provided with mold members 10 and 12 (Fig. 1) which operate to press together work pieces previously coated with cement. For positioning an insole accurately in the machine two pairs of positioning fingers 14 and 16 (Fig. 3) are constructed and arranged to center the insole on the mold member 12. The mold member 10 (Fig. 1) is carried by an arm 18 mounted for swinging movement on a pin 20 at the forward end of a cam lever 22 and is yieldingly supported against downward movement by a compression spring 24. In its rest position the arm 18 is arranged at a slight angle to the vertical, as shown in Fig. 1, with the mold member 10 laterally offset from the mold member 12. In the operation of the machine the operator grasps a handle 26 at the upper end of the arm and swings the arm in a clockwise direction, as seen in Fig. 1, to bring the mold member 10 into vertical alinement with the mold member 12. Such movement of the arm actuates mechanism not shown in the drawings to cause a cam shaft 28 to make one complete revolution thus operating a cam 30 and the cam lever 22 to move the arm 18 downwardly and thereby to cause the mold member 10 to press the work pieces together and to shape them upon the contoured surface of the lower mold member 12. Referring to Figs. 4 and 5, the lower mold member 12 is rigidly mounted on a block 32 secured to the frame of the machine. Referring to Fig. 3, the work positioning fingers 14 project upwardly from the free ends of arms 34 pivotally mounted on screws 36 and geared together for equal and opposite movement. Similarly the work positioning fingers 16 project upwardly from the free end portions of arms 38 pivotally mounted together with the arms 34 on the screws 36 and geared together for equal and opposite movement independently of the movement of the arms 34. The arms 38 are connected together by a spring 40 which urges the fingers 16 into work engaging position and a similar spring (not shown) connects the arms 34. Referring to Fig. 2, the screws 36 are mounted in a carriage or slide 42 mounted for vertical movement in suitable ways in the machine frame. In the illustrated machine the slide 42 and the work positioning members mounted thereon are normally retained by gravity at the limit of their downward movement, said position being determined by the engagement of a plate 44 secured to the slide 42 with a fixed abutment 46. In order to provide for adjustment of the plate 44 on the slide 42 said plate is mounted by screws 48 extending through vertical slots 50 in said slide. When the slide is in its lower position, as shown in Fig. 2, the work positioning fingers 14 and 16 are downwardly offset from their work engaging position illustrated in Fig. 4.

The illustrated machine is provided with means which operates automatically to lift the slide 42 thereby to bring the work positioning fingers 14 and 16 into their operative position illustrated in Fig. 4. Such movement of the slide is effected by the upward movement of arm 18 which separates the mold members after the completion of their molding operation. To this end a hook 52 (Fig. 4) is pivotally mounted on an arm 54 clamped to a stud 56 projecting downwardly from an extension 58 of the base of the mold member 10, said hook being urged in a counterclockwise direction by a spring 60 positioned between the upwardly extending tail portion 62 of the hook and the extension 58. During the downward movement of the mold member 10 the hook 52 is brought into engagement with a rectangular plate 64 (Figs. 3 and 4) secured by a screw 66 to one of the screws 36 in the slide 42. During the latter part of the downward movement of the mold member the lower end portion of the hook engages a beveled edge face 68 of the plate 64 and is deflected thereby sufficiently to permit said end portion to pass beyond the plate whereupon the spring 60 brings the hook into position to engage the plate during the upward movement of the mold member, as shown in Fig. 4. The machine comes to the end of its power cycle with the arm 18 at the limit of its upward movement and the mold member 10 disengaged from the work. Concomitantly with the termination of the power cycle the force of gravity swings the arm 18 in a counterclockwise direction, as seen in Fig. 1, into its rest position and moves the hook 52 laterally into its position in Fig. 1 which is out of engagement with the plate 64. Thereupon the weight of the slide 42 and the parts mounted thereon is taken by a detent 70 (Fig. 2) which engages a hemispherical projection 72 on the slide 42. The detent 70 is formed in a lever 74 pivotally mounted on a headed screw 76 mounted in the machine frame. The lever 74 is urged in a counterclockwise direction, as seen in Fig. 2, by a spring 78 the upper end of which is anchored to a pin 80 projecting laterally from the hub of the lever 74 and the lower end portion of which is anchored to a fixed plate 82. In the usual operation of the machine the lever 74 is operated manually to disengage the detent 70 from the projection 72 before starting the power cycle of the machine in order to permit the slide 42 and the work positioning fingers to move downwardly into their position in Fig. 5. If the operator should fail to operate the lever 74, as above described, the mold member 10 will engage the fingers 14 and 16 during its downward movement and move the fingers together with the slide 42 downwardly. To facilitate such downward movement of the slide by the mold member 10 the detent 70 has a downwardly inclined upper surface and a relatively light downward force applied to the slide 42 causes the projection 72 to deflect the detent laterally to permit the slide to move downwardly into its position shown in Fig. 2.

The illustrated machine is well adapted to assemble the parts comprising the bottom unit illustrated in Fig. 6 which consists of an insole 84, a shank stiffener 86, and a shank and heel piece 88 which is somewhat larger than the shank and heel portion of the insole. In the assembling of said parts in the illustrated machine the insole 84 is mounted on the lower mold 12 and a forepart supporting plate 90. The insole is located lengthwise on the work supports by an abutment member (not shown) and is located widthwise thereof by the fingers 14 and 16 which also serve to orient the insole relatively to the mold 12. While the insole is held in position by the fingers 14 and 16 the shank stiffener 86 is mounted on the insole and positioned relatively thereto by bringing its toeward end into engagement with a channel member 92, said channel member having been brought into engagement with the insole by the operation of a treadle (not shown). After the shank stiffener is so located the treadle is further operated to bring a presser member 94 into engagement with the toeward end portion of the shank stiffener to hold the shank stiffener and the insole against dislocation. The lever 74 is now operated to withdraw the detent 70 and permit the slide 42, together with the work positioning fingers 14 and 16, to move downwardly under the force of gravity into their positions shown in Fig. 5. It will be understood that such downward movement of the finger assembly into its inoperative position greatly facilitates the placement of the shank and heel piece on the insole. This is particularly true when said shank and heel piece is substantially oversize, as shown in Fig. 6, since the fingers, if permitted to remain in their operative position, as shown in Fig. 4, would have to be manually retracted to permit the shank and heel piece to be mounted on the insole. By providing for the downward movement of the finger assembly prior to the mounting of the shank and heel piece on the insole, such manual retraction of the fingers to provide clearance for the shank and heel piece is obviated and the assembling of the parts is thereby greatly accelerated. The time required to operate the lever 74 does not increase the total time required for the entire operation since the operator can actuate the lever with one hand while reaching for the shank and heel piece with the other hand. After the finger assembly has been brought into its inoperative position the shank and heel piece 88 is immediately mounted on the assembled insole and shank stiffener. Inasmuch as the shank and heel piece is somewhat oversize its position on the insole is not critical and the operator will readily locate it with sufficient accuracy without the aid of positioning mechanism. After positioning the shank and heel piece the operator swings the arm 18 to bring the upper mold member 10 into vertical alinement with the lower member and to start the power cycle of the machine. In the course of the power cycle the mold member 10 moves downwardly to press the assembled shoe parts together and to mold them to the contour of the bottom mold 12. During the latter part of the power cycle the mold member 10 moves upwardly and the hook 52 engages the plate 64 and raises the carrier 42 and the finger assembly mounted thereon into their operative position illustrated in Fig. 4. The arm 18, together with the mold member 10 and the hook 52 is then swung about the pivot 20 (Fig. 1) by the force of gravity into its position illustrated in Fig. 1 in which the mold member 10 is offset laterally from the mold member 12 and the hook 52 is in a position remote from the plate 64. The detent 70 now sustains the weight of the slide 42 and the finger assembly, and thus maintains the finger assembly in its operative position ready for the next succeeding operation of the machine.

Having thus described my invention, what I claim as new and desire to secure by Letters Patent of the United States is:

1. In a molding machine, the combination with two members relatively movable to mold work pieces positioned between them, and means for positioning the work relatively to said members, of a carriage for said positioning means movable vertically downward to locate said means in an inoperative position out of contact with the work and normally positioned at the lower extremity of its vertical movement, and means actuated by a movement of separation of the molds for engaging said carriage and positively moving it upwardly to move said work positioning means from its inoperative position to its operative position.

2. In a molding machine, the combination with two members relatively movable to mold work pieces positioned between them, and means for positioning the work pieces relatively to said mold members, of a carriage for said positioning means movable vertically upward into a position in which said positioning means is arranged to engage work pieces positioned between the mold members, said carriage being normally positioned at the lower extremity of its vertical movement, and means operable by a movement of separation of said mold members to engage said carriage and to move it upward positively thereby to bring said positioning means into position to engage work pieces positioned between the mold members, said carriage moving means being moved laterally by another relative movement of said mold members into a position remote from said carriage.

3. In a molding machine, the combination with two members arranged for a relative vertical movement to mold work pieces positioned between them, and means for centering the work relatively to said members, of a carriage for said centering means movable vertically downward into a position in which said centering means is out of contact with the work, said carriage being normally positioned at the lower extremity of its vertical movement, means operable by a movement of separation of said mold members for engaging the carriage and for moving it upward positively to bring said centering means into work contacting position, and a detent for retaining the carriage in its upper position.

4. In a molding machine, the combination with two members arranged for a relative vertical movement to mold work pieces positioned between them, and means for centering the work relatively to said members, of a carriage for said centering means movable vertically downward into a position in which said centering means is out of contact with the work, said carriage being normally positioned at the lower extremity of its vertical movement, means operable by a movement of separation of said mold members for engaging the carriage and for moving it upward positively to bring said centering means into work contacting position, and a detent for retaining the carriage in its upper position, said detent being constructed and arranged to yield in response to downward force upon the carriage to permit movement of the carriage into its lower position.

5. In a molding machine, the combination with a fixed lower mold, an upper mold movable vertically and laterally, means for centering an insole relatively to the lower mold, and means for locating a stiffener relatively to the insole, of a vertically movable carriage on which said insole centering means is mounted, said carriage being normally positioned at the lower extremity of its vertical movement, means movable vertically with the upper mold to lift the carriage and movable laterally with the upper mold out of engagement with the carriage, a detent for holding the carriage against downward movement, and a manually operated member for releasing said detent.

6. In a molding machine, the combination with mold members constructed and arranged for relative movement in one direction to mold work pieces positioned between them and for relative movement in a different direction to arrange said mold members out of alinement with each other, of means for centering an insole relatively to the mold members, a carriage for said centering means constructed and arranged for movement relatively to said mold members, and a carriage engaging member actuated by the first-mentioned relative movement of said mold members to move the carriage upwardly into a predetermined position, and transferred by the second-mentioned relative movement of said mold members into a position in which it is out of engagement with the carriage.

7. In a molding machine, the combination with a fixed lower mold, a vertically movable upper mold, and means for centering the work relatively to the lower mold, of a vertically movable carriage on which said centering means is mounted, said carriage being normally positioned at the lower extremity of its vertical movement, a hook movable with the upper mold for imparting upward movement to the carriage, and a detent for holding the carriage against downward movement.

8. In a molding machine, the combination with a fixed lower mold, an upper mold movable vertically and laterally, and means for centering the work relatively to the lower mold, of a vertically movable carriage on which said centering means is mounted, and means movable vertically upward with the upper mold to lift the carriage and movable laterally with the upper mold out of engagement with the carriage.

9. In a molding machine, the combination with a fixed lower mold, an upper mold movable vertically and laterally, and means for centering the work relatively to the lower mold, of a vertically movable carriage on which said centering means is mounted, means movable vertically upward with the upper mold to lift the carriage and movable laterally with the upper mold out of engagement with the carriage, and a detent for holding the carriage against downward movement.

CARL A. NEWHALL.

REFERENCES CITED

The following references are of record in the file of this patent:

UNITED STATES PATENTS

| Number | Name | Date |
|---|---|---|
| 2,065,465 | Whelton | Dec. 22, 1936 |
| 2,151,974 | Kennison et al. | Mar. 28, 1939 |
| 2,305,670 | Cantley | Dec. 22, 1942 |